Sept. 12, 1967  A. MAGG ETAL  3,340,749
CONTINUOUSLY VARIABLE TRANSMISSION HAVING EXTENDED
DRIVE RATIO RANGE
Filed April 30, 1965  3 Sheets-Sheet 1

INVENTORS,
ALFRED MAGG,
HEINZ HAESSLE,
FRIEDRICH SCHREINER,
ROLAND LIEBEL,
KLAUS BREDSCHNEIDER,
HANS BUETTNER,
ERICH PETERSON,
RUDOLPH SCHRODT

BY *Albert W. Zalkind*

ATTORNEY

INVENTORS,
ALFRED MAGG,
HEINZ HAESSLE,
FRIEDRICH SCHREINER,
ROLAND LIEBEL,
KLAUS BREDSCHNEIDER,
HANS BUETTNER,
ERICH PETERSON,
RUDOLPH SCHRODT

United States Patent Office 3,340,749
Patented Sept. 12, 1967

3,340,749
CONTINUOUSLY VARIABLE TRANSMISSION
HAVING EXTENDED DRIVE RATIO RANGE
Alfred Magg, Heinz Haessle, and Friedrich Schreiner, Friedrichshafen, Roland Liebel, Friedrichshafen-Seemoos, Klaus Bredschneider, Kaiserslautern, Hans Buettner and Erich Peterson, Bad Homburg, and Rudolph Schrodt, Kronberg, Taunus, Germany, assignors to Zahnradfabrik Friedrichshafen AG, Friedrichshafen, Germany
Filed Apr. 30, 1965, Ser. No. 452,113
Claims priority, application Germany, May 2, 1964, Z 10,815
16 Claims. (Cl. 74—689)

This invention relates to a variable speed transmission having a drive ratio which is infinitely variable within a relatively wide range of available drive ratios.

It is therefore a primary object of this invention to provide a transmission arrangement utilizing an infinitely variable type of drive unit having a rather limited drive ratio range to produce a stepless variation in drive ratio within several stages to form an extended drive ratio range.

An additional object of the present invention is to provide a transmission having several drive ratio stages arranged to avoid any discontinuity in the variation of drive ratio of the transmission as it progresses through each of the stages to the next stage.

A further object of this invention is to provide an arrangement of an infinitely variable drive, a fixed ratio drive and a planetary gear unit by means of which the transmission ratio may be infinitely varied by the variable drive in several stages prescribed by the fixed ratio drive in such a manner as to prevent any transitional gaps, or load accelerations when shifting from one stage to another.

In accordance with the foregoing objects, the fixed drive ratios of the fixed ratio drive trains and the drive ratio capability of the planetary gear unit are selected pursuant to the principles of the present invention as functions of the ratio between the maximum and minimum output speeds of the variable drive unit. Thus, the drive ratio range of the variable drive unit and more particularly the ratio limits of this range will prescribe the gear ratios associated with the planetary gearing and the fixed ratio drive trains established between the planetary gear unit and the variable drive unit.

A still further object in accordance with the foregoing is to establish several forward drive ratio stages and a reverse drive stage by means of clutch and brake mechanisms which are selectively engaged to condition the gearing for transmission of torque along different paths. The transmission paths are, therefore, arranged to establish drive ratios equal to the ratio limits of the variable drive unit as functions of the ratio shift range ($i$). Also, the gear ratio of the planetary gear unit is selected in accordance with the expression $2i-1$, in order to achieve the objectives aforementioned with respect to the reverse drive stage of operation.

A detailed description of the invention now follows in conjunction with the appended drawing in which.

Figure 1:
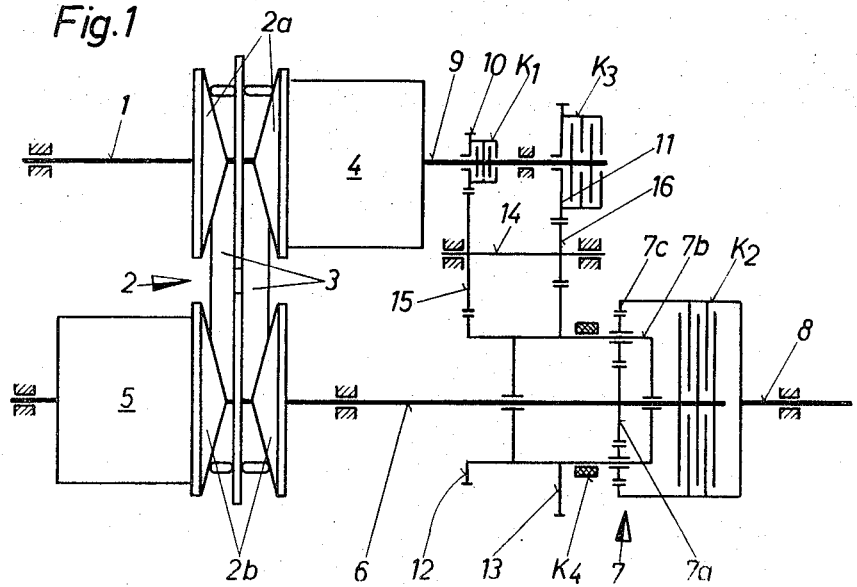
FIGURE 1 is a schematic illustration of one form of transmission constructed in accordance with the present invention.

Referring now to the drawing, FIGURE 1 illustrates a transmission arrangement in which an input shaft 1 drives a variable type of drive unit generally denoted by reference numeral 2. This type of drive unit is well known and includes drive wheels 2a continuously driven by the input shaft in axially spaced relation to each other. The spacing between the drive wheels is adjusted by a shifting mechanism 4 so as to vary the engaging diameter for the drive transfer element 3, while the shifting mechanism 5 correspondingly varies the spacing between the driven wheels 2b which are drivingly connected to the variably driven shaft 6. The variable drive unit 2 may have a relatively limited drive ratio range so that a rather small unit could be utilized to advantage despite the comparatively large ratio range for the overall transmission. The ratio range is, of course, defined as the ratio of the maximum to the minimum ratio limit associated with the particular variable drive unit selected and is hereafter represented as ($i$). Where the variable drive unit is of the reduction type, the driven shaft 6 would be rotated at a 1:1 ratio at the upper ratio limit and at a $1/i$ ratio at the lower ratio limit in terms of the ratio range ($i$) associated with the drive unit. In other types of drive units the ratio range is symmetrically distributed between overdrive and reduction drive portions so that it will have an upper limit of $i^{\frac{1}{2}}$ and a lower limit of $i^{-\frac{1}{2}}$. The ratio range $i$ and the ratio limits as indicated will determine the gear ratios associated with the other components of the transmission, as will be hereafter explained.

With continued reference to FIGURE 1, it will be noted that the driven shaft 6 is connected to the drive element of a planetary gear unit 7. The drive element is in the form of a sun gear 7a in mesh with planet pinions rotatably mounted on a planet carrier 7b constituting the control element of the planetary gear unit. The output element of the planetary gear unit is formed by an orbit gear 7c in mesh with the planet pinions and connected to the output shaft 8. The shafts 6 and 8 are, therefore, journaled in axially aligned relation to each other and in parallel spaced relation to a drive shaft 9 to which the input shaft is connected for continuous rotation therewith.

A positive gear drive arrangement is provided for establishing a plurality of fixed ratio drive trains through the planetary gear unit. A countershaft 14 is, therefore, journaled between the shafts 6 and 9 to which the gears 15 and 16 are connected. The countershaft gears are respectively in constant mesh with gears 12 and 13 connected to the planet carrier 7b and in mesh with the gears 10 and 11 rotatably mounted on the drive shaft 9. It will, therefore, be apparent that the control element of the planetary gear unit may be rotated at two different speeds proportional to the speed of the input shaft dependent upon which of the gears 10 and 11 are coupled to the drive shaft 9. Accordingly, the drive shaft mounts a pair of selectively engaged clutch mechanisms K1 and K3 to respectively couple the gears 10 and 11 to the drive shaft 9. The planetary gear unit is thereby conditioned to transmit torque by combining two power paths respectively extending through the variable drive unit 2 and through the fixed ratio gearing. The planetary gear unit is also provided with a lock-up clutch K2 selectively engaged to couple the driven shaft 6 to the output shaft 8 when both of the clutch mechanisms K1 and K3 are disengaged. In order to condition the transmission for reverse drive, the carrier element 7b of the planetary gear unit is provided with a brake mechanism K4. Selective engagement of the brake mechanism while all of the cltuches are disengaged will, therefore, reverse the drive between the shafts 6 and 8 at a reduction ratio dependent upon the gear ratio ($C_p$) between the orbit and sun gears 7c and 7a. The gear ratio is preferably selected in accordance with the formula: $C_p=2i-1$, as hereinbefore mentioned.

Based upon the gear arrangement described in connection with FIGURE 1, the output speed of the output shaft 8 may be expressed in terms of the input speed ($n$) as:

$$\frac{n}{C_p} \cdot [C_r(1+C_p)-R]$$

where $C_r$ is the fixed ratio established by engagement of either clutch K1 or K3 and R is the variable ratio of the variable drive unit 2. When the clutch K2 is engaged, the planetary gear unit is by-passed so that the output speed is then $nR$. When the brake K4 is engaged, the output speed is then $$\frac{-nR}{C_p}$$

It will, therefore, be apparent that the transmission may be conditioned in its various ratio stages by engagement of a different one of the drive establishing devices K1, K2, K3 and K4 and that the output speed will be a different function of the variable drive ratio R of the drive unit 2 for each operational stage. Therefore, the output speed range for each stage may be determined by substituting the ratio limits of the drive unit 2 for the variable R appearing in each of the foregoing expressions corresponding to the respective operational stages.

Assuming, for example, that the upper and lower ratio limits for the drive unit 2 are $i^{-\frac{1}{2}}$ and $i^{\frac{1}{2}}$, the gears of the fixed ratio gearing are selected to correspondingly establish fixed gear ratios equal to those of the ratio limits. The output speeds of the transmission may then be calculated from the foregoing formulae as summarized in the following chart:

transition may be effected between the forward and reverse drives of the transmission.

Although the ratio shifting attributes have been described with respect to a symmetrical distribution of the drive ratios of the drive unit 2 between reduction and over-drive ratios, it should be appreciated that similar results are achieved where the ratios vary between 1:1 and $1/i$ in which case the fixed gear ratio between gears 10 and 12 is $1/i$ and between gears 11 and 13 the gear ratio is 1:1. Different output speed limits are then established but the same ratio shifting pattern is preserved. The same objectives are also attained utilizing other ratio distributions in the variable drive unit as, for example, one in which the speed varies between $ni_1$ and $n/i_2$, where $$i_1 \cdot i_2 = i$$

The corresponding fixed gear ratios would then be $i_1$ and $1/i_2$.

Figure 2:
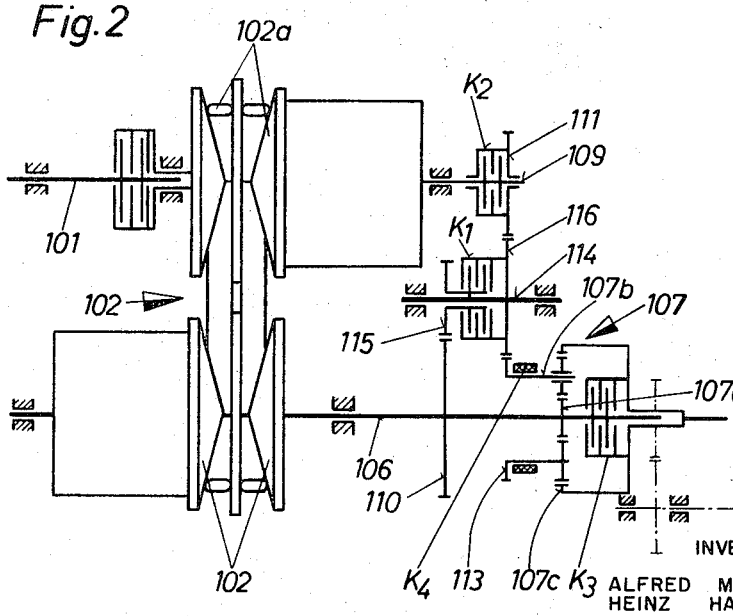
FIGURE 2 shows a second form of transmission in accordance with the present invention.

Referring now to FIGURE 2, a transmission similar to that of FIGURE 1 is shown in that the input shaft 101 drives the drive wheels 102a of a variable drive unit 102 also having driven wheels 102b. A planetary gear unit 107 is also employed having its sun gear 107a driven at a variable drive ratio by the shaft 106 to transmit torque to the output orbit gear 107c which meshes with the planet pinions carried by the control carrier element 107b. The planetary unit is also provided with a by-pass clutch K3 and a reverse drive brake K4 similar to those described in connection with FIGURE 1 from an operational as well as a structural standpoint.

The fixed ratio gearing associated with the transmission of FIGURE 2 includes a single clutch K2 mounted on the drive shaft 109 continuously driven by the input shaft for coupling the gear 111 thereto. The gear 111 is drivingly connected to the control element 107b of the planetary gear unit by the countershaft gear 116 and the gear 113 in constant mesh with each other to establish one of

| Drive Stage | Engaged Device | | | | Fixed Gear Ratios | Output Speeds | |
|---|---|---|---|---|---|---|---|
| | K1 | K2 | K3 | K4 | | Lower limit | Upper limit |
| Low | X | | | | $i^{-\frac{1}{2}}$ | $\frac{n}{C_p}(C_p+1-1)i^{-\frac{1}{2}}$ | $ni^{-\frac{1}{2}}$ |
| Intermediate | | X | | | — | $ni^{-\frac{1}{2}}$ | $ni^{\frac{1}{2}}$ |
| Overdrive | | | X | | $i^{\frac{1}{2}}$ | $ni^{\frac{1}{2}}$ | $\frac{ni^{\frac{1}{2}}}{C_p}(C_p+1-1/i)$ |
| Reverse | | | | X | 0 | $\frac{-ni^{\frac{1}{2}}}{C_p}$ | $\frac{-ni^{-\frac{1}{2}}}{C_p}$ |

From the foregoing chart it will be observed that the output speed may be infinitely varied from the lower limit to the upper limit of the first stage which is also the lower limit of the second stage. Also, while the increase in output speed in the first stage is achieved by varying the drive ratio of the drive unit 2 in one direction between limits, the drive ratio of the drive unit 2 is varied between limits in the opposite direction during the second operational stage to continue the increase in the output speed. The direction of shift in the drive unit is again reversed to continue the increase in output speed within the third stage having a lower limit which is the same as the upper limit of the second stage. It should therefore be apparent that the variable drive unit may be shifted back and forth between its ratio limits in order to continuously vary the output speed through all of the forward drive stages without interruption or any discontinuity.

It will also become apparent that since the gear ratio $C_p$ for the planetary unit 7 is $2i-1$, the lower limit of the lowest forward operational stage will be equal to one of the limits of the reverse stage. Accordingly, a smoother the fixed gear ratios when clutch K2 is engaged. The other fixed gear ratio is established by a disengageable drive connection between the driven shaft 106 and the countershaft gear 116 on the countershaft 114. Thus, a gear 110 is connected to the shaft 106 in mesh with a gear 115 rotatably mounted on the countershaft 114. A clutch K1 is therefore engaged to couple the gear 115 to the gear 116.

When the clutch K1 is engaged, the output speed will be in accordance with the expression:

$$\frac{nR}{C_p}C_r'(1+C_p)-1$$

where $C_r'$ is the gear ratio between gears 110 and 113. Thus, the output speed limits may be calculated for the first operational stage. Engagement of clutch K2 will establish the second operational stage characterized by a drive train arrangement similar to the first stage of the FIGURE 1 transmission. The third stage is similar to the second stage associated with FIGURE 1 while the reverse drive stages are the same. The speed limits for the various stages of the transmission shown in FIGURE 2 may therefore be determined from the available formulae and are summarized as follows, based upon a symmetrical distribution of drive ratios in the variable drive unit 102:

(1) $\dfrac{ni^{-3/2}}{C_p}(C_p+1-i)$ to $\dfrac{ni^{-1/2}}{C_p}(C_p+1-i)$ (2) $\dfrac{ni^{-1/2}}{C_p}(C_p+1-i)$ to $ni^{-1/2}$ (3) $ni^{-1/2}$ to $ni^{-1/2}$ Reverse—

$$\dfrac{ni^{-1/2}}{C_p} \text{ to } \dfrac{-ni^{1/2}}{C_p}$$

The arrangement of FIGURE 2 will be more advantageous than of FIGURE 1 because the drive ratio may be shifted into reverse without any transitional shift in the variable drive unit from one limit to the other as would be necessary in the FIGURE 1 arrangement. This is, of course, accomplished by introducing the fixed ratio gear train between the output of the variable drive unit and the control element of the planetary unit to establish the lowest speed stage of operation. In this form of transmission, however, additional gearing may be required as shown by dotted line to obtain the proper overall drive ratios.

Figure 3:
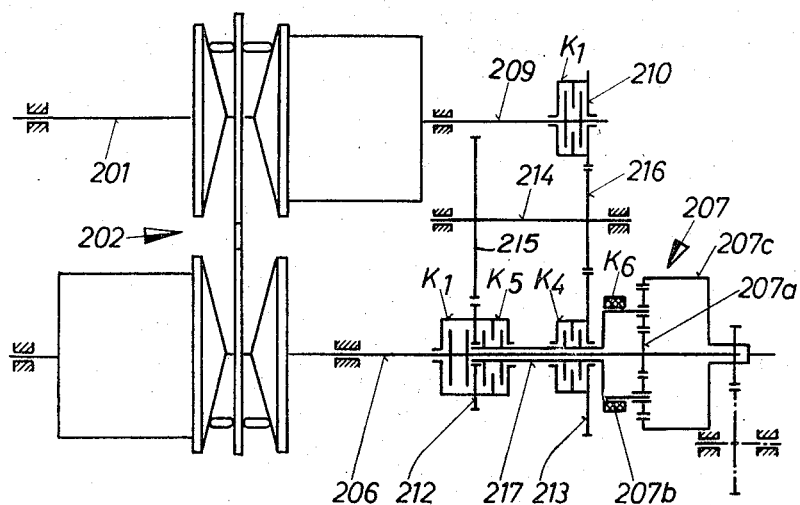
FIGURE 3 shows a third form of transmission.

A further extended drive ratio range may be obtained by establishing four forward drive stages in an arrangement such as illustrated in FIGURE 3. Like in the previous forms of transmissions, the input shaft 201 directly drives drive shaft 209 and through the variable drive unit 202 to drive the driven shaft 206. Also, the sun gear 207a in the planetary gear unit 207 is connected to the shaft 206 and is drivingly engaged with the carrier 207b and the orbit gear 207c through planet pinions. One fixed ratio drive train is established between the drive shaft 209 and the control element 207b by constant mesh gears 210, 216 and 213 upon simultaneous engagement of clutches K2 and K4, respectively, coupling gear 210 to shaft 209 and gear 213 to the hollow shaft 217 through which shaft 206 extends. Another drive train is established when the clutch K5 is engaged at the same time clutch K2 is engaged, in which case gears 215 and 212 are included in the drive train instead of gear 213. Two other fixed ratio drive trains are established between shaft 206 and the planetary gear unit upon engagement of clutch K1 simultaneously with clutch K4 and K5. Engagement of clutch K1 couples shaft 206 to gear 212 in constant mesh with gears 215 and 216 connected to the countershaft 214. If clutch K5 is engaged at the same time as clutch K1, lock up of the planetary gear unit occurs and the output speed of orbit gear 207c is equal to that of the variable speed shaft 206. When clutches K1 and K4 are engaged, the countershaft gears 215, 216 drivingly connect the constant drive shaft 208 to the sun gear 207a and the carrier element 207b to establish the first drive stage. For reverse drive, all clutches are disengaged as in the previously described transmissions and only the brake K6 is engaged to hold the carrier element 207b stationary.

The output speed limits associated with the transmission of FIGURE 3 based upon ratio limits of $i^{-1/2}$ and $i^{1/2}$ in the variable drive unit 202 are summarized in the following chart:

| Drive Stages | Engaged Devices | | | | | | Output Speeds | |
|---|---|---|---|---|---|---|---|---|
| | K1 | K2 | K3 | K4 | K5 | K6 | Lower limit | Upper limit |
| 1st | X | | | X | | | $\dfrac{ni^{-3/2}}{C_p}(C_p+1-i)$ | $\dfrac{ni^{-1/2}}{C_p}(C_p+1-i)$ |
| 2d | | X | | X | | | $\dfrac{ni^{-1/2}}{C_p}(C_p+1-i)$ | $ni^{-1/2}$ |
| 3d | X | | | | X | | $ni^{-1/2}$ | $ni^{1/2}$ |
| 4th | | X | | | X | | $ni$ | $\dfrac{ni^{1/2}}{C_p}(C_p+1-1/i)$ |
| Rev | | | | | | X | $\dfrac{-ni^{-1/2}}{C_p}$ | $\dfrac{-ni^{1/2}}{C_p}$ |

Figure 4:
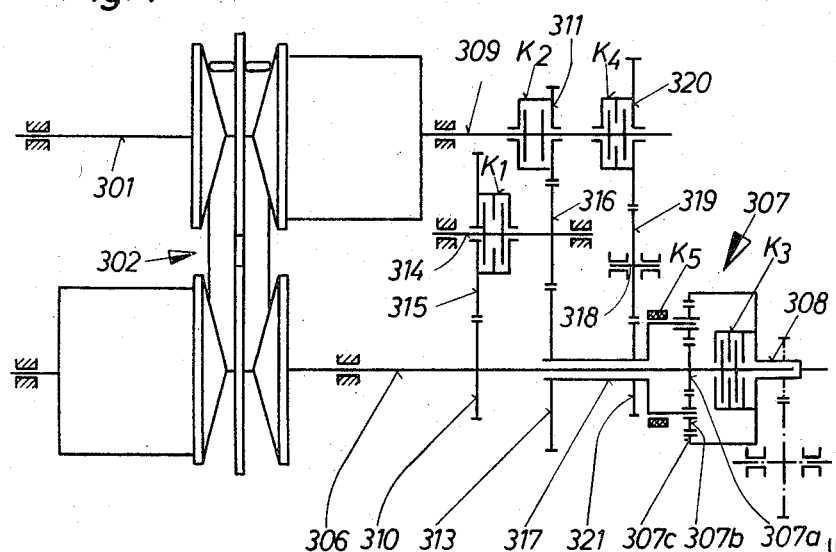
FIGURE 4 shows a fourth form of transmission embodying certain features of the first and second forms.

It will be apparent from the foregoing chart that each of the forward drive stages requires engagement of two clutches and, hence, a more complicated shift control system as compared to the arrangements of FIGURES 1 and 2 wherein a single clutch is engaged for each drive stage. In FIG. 4 an arrangement is shown wherein four forward drive stages are also established as in FIGURE 3 but utilizing a single clutch for each stage. The arrangement of FIGURE 4 is similar to that of FIGURE 2 except that an additional fixed ratio drive train is introduced between the drive shaft 309 and the hollow shaft 317 to which the control element 307b is connected in the planetary gear unit 307. Accordingly, the gear 320 may be coupled to the drive shaft by engagement of clutch K4 in order to establish a fourth overdrive ratio through the constant mesh gears 320, 319 and 321. In this form of transmisison the gear ratios between the gears 310 and 315 and between gears 316 and 313 will be $i^{-1/2}$ respectively so that engagement of clutch K1 will establish a drive ratio of $1/i$ between shafts 306 and 317 in the first stage by coupling of gear 315 to the countershaft 314. Engagement of clutch K2 couples gear 311 to shaft 309 to complete a drive train through gears 316 and 313 at a ratio of $i^{-1/2}$. A direct drive through the planetary unit is effected by engagement of clutch K3 for 3rd stage operation. The gear ratio between gears 320 and 321 for fourth stage operation will be $i^{1/2}$. Reverse drive is also obtained by engagement of the brake K5.

Figure 6:
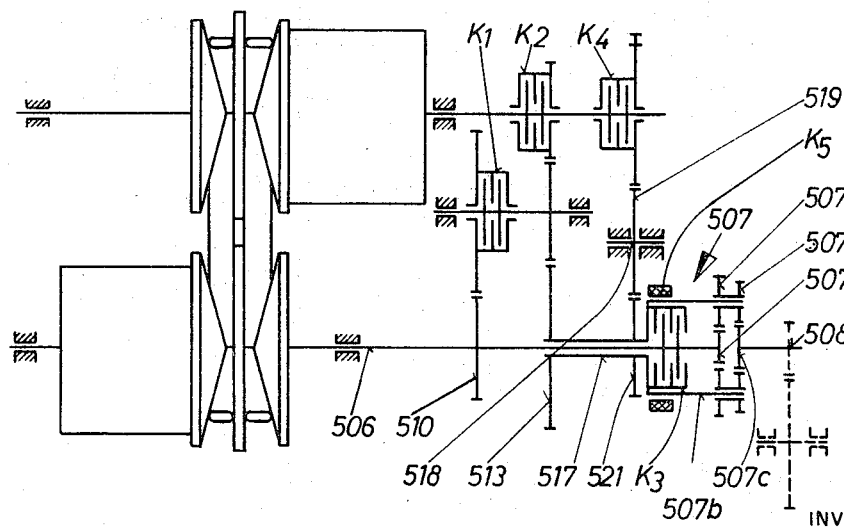
FIGURE 6 illustrates a transmission based upon the form depicted in FIGURE 4 having a modified type of planetary gear unit.

The transmission of FIGURE 6 is the same as that of FIGURE 4 except for the planetary gear unit 507. So that the diameter of the housing necessary to enclose the planetary gear unit may be kept small, only externally toothed gear members are utilized. The sun gear 507a to which the variable driven shaft 506 is connected, meshes with compound planet pinions 507d–507e rotatably carried by the carrier element 507b. The output sun gear 507c meshes with the compound planet pinions to drive the output shaft 508 when the control element is either driven from the drive shaft or from the driven shaft 506 through fixed ratio drive trains or when the control element is held stationary by the brake K5. The drive trains driven from the drive shaft are established through gears 513 and 521 connected to the control element by the hollow shaft 517. The disengageable drive between the shaft 506 and the control element is controlled by the clutch K1 to complete a drive train between gear 510 connected to shaft 506 and gear 513 connected to shaft 517. A lock-up clutch K3 is also provided to couple the shaft 506 to the control element in order to obtain direct drive between the output shaft and the variable drive unit.

Figure 5:
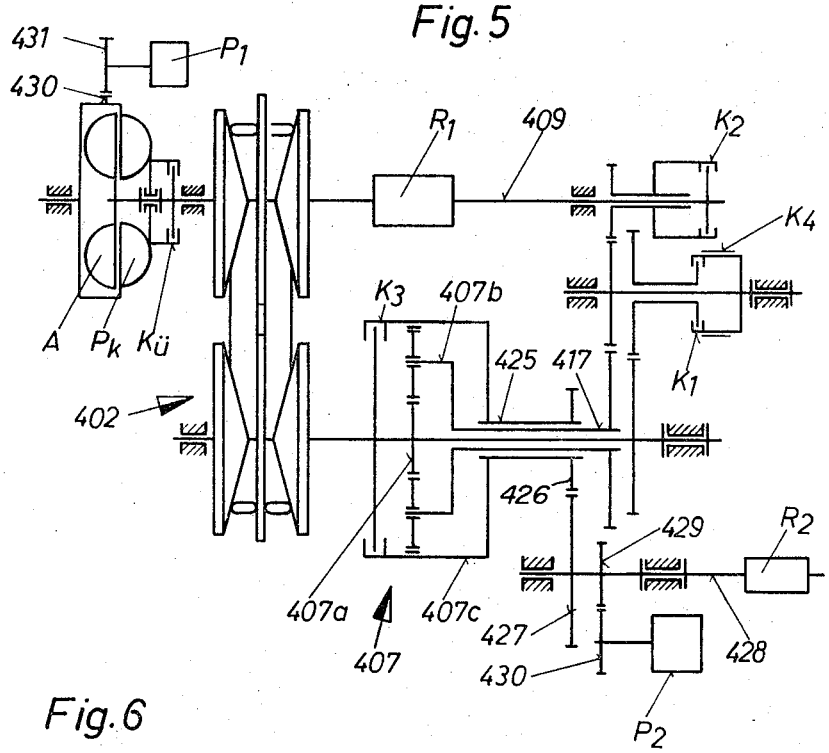
FIGURE 5 illustrates a transmission based upon the form depicted in FIGURE 2, modified for automotive installation.

FIGURE 5 illustrates a transmission based upon the arrangement depicted in FIGURE 2, but modified for automotive installation. The variable drive unit 402 is driven through a fluid device A having an impeller P$k$ and through which fluid under pressure may be circulated by a fluid filling pump P1 driven by the impeller through the gears 430 and 431. A by-pass clutch K$u$ is also provided directly coupling the impeller to the variable drive unit when fluid drive is no longer needed.

The planetary gear units 407 is rearranged relative to the fixed ratio drive trains controlled by the clutches K1 and K2 while the brake K4 is operative through the fixed ratio gearing to hold the carrier element 407b stationary for reverse drive. The carrier is, therefore, connected to hollow shaft 417, through which the variable speed shaft extends, to drive the sun gear 407a and one of the gears in the fixed ratio gearing. The output gear 407c is connected to the output shaft 425 journaled on the shaft 417 and through gears 426 and 427 drives the final driven shaft 428. Gears 429 and 430 form a power take-off drive from the final output shaft 428 to operate a lubricating pump P2.

Speed changing operation of the variable drive unit 402 and selective engagement of the forward drive clutches K1, K2 and K3 may be effected in accordance with the speeds of both the drive shaft 409 and the output shaft 428. Toward this end, the drive and output shafts respectively operate speed regulating pumps R1 and R2 through which pressure speed signals may be generated in order to produce a differential pressure signal for control purposes.

Having thus described the invention, it is realized that changes may be made without departing from the spirit thereof and, therefore, it is not desired that the invention be limited to the precise illustration herein given except as set forth in the following claims.

What is claimed is:

1. A plural speed transmission comprising, an input member, an output member, infinitely variable drive means connected to said input member having a limited drive ratio range, a planetary gear unit having a plurality of drivingly engaged elements including a drive element connected to said infinitely variable drive means for rotation at infintely variable speed drive ratio limits, a driven element connected to said output member and a control element, and speed change gear means drivingly connecting the input member to the planetary gear unit through separate drive trains at fixed drive ratios equal to the drive ratio limits of the infinitely variable drive means.

2. A plural speed transmission as set forth in claim 1, wherein said planetary gear unit and said fixed ratio gear means include a plurality of drive engagement devices for selectively establishing a plurality of different drive trains between the input and output members at drive ratios unidirectionally varied by reversal in the direction of variation of the infinitely variable drive means.

3. A plural speed transmission as set forth in claim 2, wherein said drive engagement devices include: a brake mechanism connected to the control element of the planetary gear unit for establishing a reverse drive train at a reduction drive ratio through the planetary gear unit equal to $2i-1$, where $i$ equals the ration between the maximum speed of the drive element and the minimum speed thereof, and a plurality of clutch mechanisms in the fixed ratio gear means for establishing forward drive trains.

4. A plural speed transmission as set forth in claim 3, wherein the limited drive ratio range of the infinitely variable drive means is defined between drive ratio limits equal to the fixed drive ratios of the fixed ratio gear means.

5. A plural speed transmission as set forth in claim 4 wherein said drive ratio limits are $i^{-\frac{1}{2}}$ and $i^{\frac{1}{2}}$, respectively.

6. A plural speed transmission as set forth in claim 1, including a plurality of selectively controlled drive engaging devices operatively connected to the fixed ratio drive means for establishing a plurality of forward drive trains therethrough and a reverse drive train, two of said drive engaging devices being engaged to establish each of said forward drive trains at fixed drive ratios which are multiples of a predetermined ratio between the maximum and minimum speeds of the drive element.

7. A plural speed transmission as set forth in claim 1, including a plurality of selectively controlled drive engaging devices operatively connected to the fixed ratio drive means for establishing a plurality of forward drive trains therethrough and a reverse drive train, only one of said drive engaging devices being engaged to establish each of said forward drive trains at fixed drive ratios which are multiples of a predetermined ratio between the maximum and minimum speeds of the drive element.

8. A plural speed transmission as set forth in claim 1, including speed regulating pumps respectively driven by the input member and the variable drive means to generate speed signals for controlling operation of the fixed ratio gear means.

9. A plural speed transmission comprising an input member, an output member, infinitely variable drive means connected to said input member for continuously varying the speed thereof at a drive ratio unidirectionally variable between predetermined limits, a planetary gear unit having a plurality of drivingly engaged elements including a drive element connected to said infinitely variable drive means, a driven element connected to said output member and a control element, and fixed ratio changing gear means drivingly connecting said control element to the input member for changing the drive ratio through the planetary gear unit at fixed drive ratios equal to said drive ratio of the infinitely variable drive means at said predetermined limits.

10. A plural speed transmission as set forth in claim 9, wherein the fixed drive ratios are equal to $i^{-\frac{1}{2}}$ and $i^{+\frac{1}{2}}$, respectively, where $i$ equals the ratio of the maximum speed of the drive element to the minimum speed thereof.

11. A plural speed transmission as set forth in claim 10, including releasable brake means connected to the control element of the planetary gear unit for establishing a reverse drive therethrough at a reduction ratio equal to $2i-1$.

12. A plural speed transmission as set forth in claim 11, wherein said fixed ratio gear means comprises, a drive shaft continuously driven by the input member, at least two gear members rotatably mounted on said drive shaft, constant mesh gearing drivingly connecting said gear members to the control element of the planetary gear unit and disengageable clutch means for selectively coupling said gear members to the drive shaft to rotate the control element at said fixed drive ratios.

13. A plural speed transmission as set forth in claim 12, including by-pass clutch means for interconnecting two of the elements of the planetary gear unit to drive the output member at speeds controlled by said variation of the drive ratio in the infinitely variable drive means in a direction opposite to the variation during engagement of the first-mentioned clutch means.

14. A plural speed transmission comprising an input member, an output member, infinitely variable drive means connected to said input member for continuously varying the speed thereof at a drive ratio unidirectionally variable between predetermined limits, a planetary gear unit having a plurality of drivingly engaged elements including a drive element connected to said infinitely variable drive means, a driven element connected to said output member and a control element, and fixed ratio changing gear means drivingly connecting said control element to the input member for changing the drive ratio through the planetary gear unit at fixed drive ratios equal to said drive ratio of the infinitely variable drive means at said predetermined limits, wherein the fixed drive ratios are equal to $i-¼$ and $i+½$, respectively, where $i$ equals the ratio of the maximum speed of the drive element to the minimum speed thereof, and releasable brake means connected to the control element of the planetary gear unit for establishing a reverse drive therethrough at a reduction ratio equal to $2i-1$, wherein said fixed ratio gear means comprises, a drive shaft continuously driven by the input member, at least two gear members rotatably mounted on said drive shaft, constant mesh gearing drivingly connecting said gear members to the control element of the planetary gear unit and disengageable clutch means for selectively coupling said gear members to the drive shaft to rotate the control element at said fixed drive ratios, and by-pass clutch means for interconnecting two of the elements of the planetary gear unit to drive the output member at speeds controlled by said variation of the drive ratio in the infinitely variable drive means in a direction opposite to the variation during engagement of the first-mentioned clutch means and disengageable drive means selectively operable to drivingly connect the drive element of the planetary gear unit to the constant mesh gearing of the fixed ratio gear means.

15. A plural speed transmission comprising an input member, an output member, infinitely variable drive means connected to said input member for continuously varying the speed thereof at a drive ratio unidirectionally variable between predetermined limits, a planetary gear unit having a plurality of drivingly engaged elements including a drive element connected to said infinitely variable drive means, a driven element connected to said output member and a control element, and fixed ratio changing gear means drivingly connecting said control element to the input member for changing the drive ratio through the planetary gear unit at fixed drive ratios equal to said drive ratio of the infinitely variable drive means at said predetermined limits and releasable brake means connected to the control element of the planetary gear unit for establishing a reverse drive therethrough, said fixed ratio gear means comprising, a drive shaft continuously driven by the input member, constant mesh gearing drivingly engaged with said control element of the planetary gear unit, and selectively engageable drive means for drivingly connecting said drive shaft or the infinitely variable drive means to the constant mesh gearing.

16. A plural speed transmission as set forth in claim 15, including by-pass clutch means for interconnecting two of the elements of the planetary gear unit to drive the output member at speeds controlled by said variation of the drive ratio in the infinitely variable drive means in a direction opposite to the variation during engagement of the disengageable drive means.

References Cited

UNITED STATES PATENTS

| | | | |
|---|---|---|---|
| 2,834,228 | 5/1958 | Place | 74—789 X |
| 3,203,277 | 8/1965 | General | 74—689 |
| 3,244,025 | 4/1966 | Francisco | 74—690 |
| 3,251,243 | 5/1966 | Kress | 74—689 |

DONLEY J. STOCKING, *Primary Examiner.*

DAVID J. WILLIAMOWSKY, *Examiner.*

L. H. GERIN, *Assistant Examiner.*